INVENTOR.
Lawrence G. Corey
By Davis, Hoxie, Faithfull & Hapgood
Attorneys

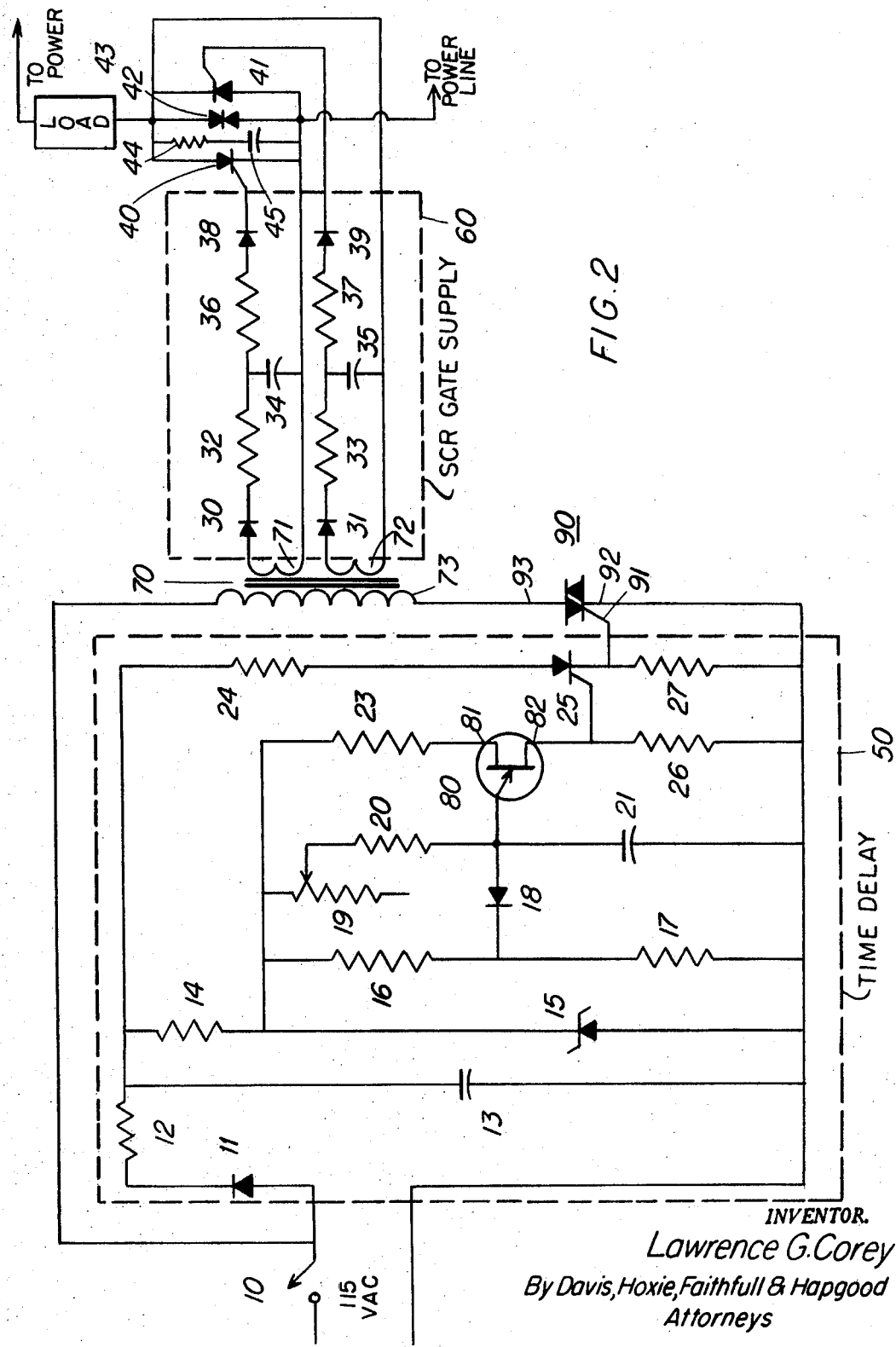

United States Patent Office 3,470,458
Patented Sept. 30, 1969

3,470,458
SOLID STATE LOAD CONTROL
Lawrence G. Corey, Rockville, Conn., assignor to The Arrow-Hart & Hegemen Electric Company, Hartford, Conn., a corporation of Connecticut
Filed Feb. 24, 1967, Ser. No. 618,516
Int. Cl. G05f 1/40, 1/52, 1/60
U.S. Cl. 323—22                              8 Claims

ABSTRACT OF THE DISCLOSURE

An electrical control circuit for switching a load, which circuit includes an adjustable time delay between initiation and accomplishment of the switching function. The switching function is accomplished by gate controlled semiconductor rectifier means. The gate control circuit of the rectifier means is transformer coupled to the control circuit which includes the time delay function. The gate control circuit includes gate controlled semiconductor rectifier means whose gate potential is constant DC with an amplitude sufficient to sustain the rectifier means conductive to latch such rectifier means in a conductive state.

---

Figure 1:
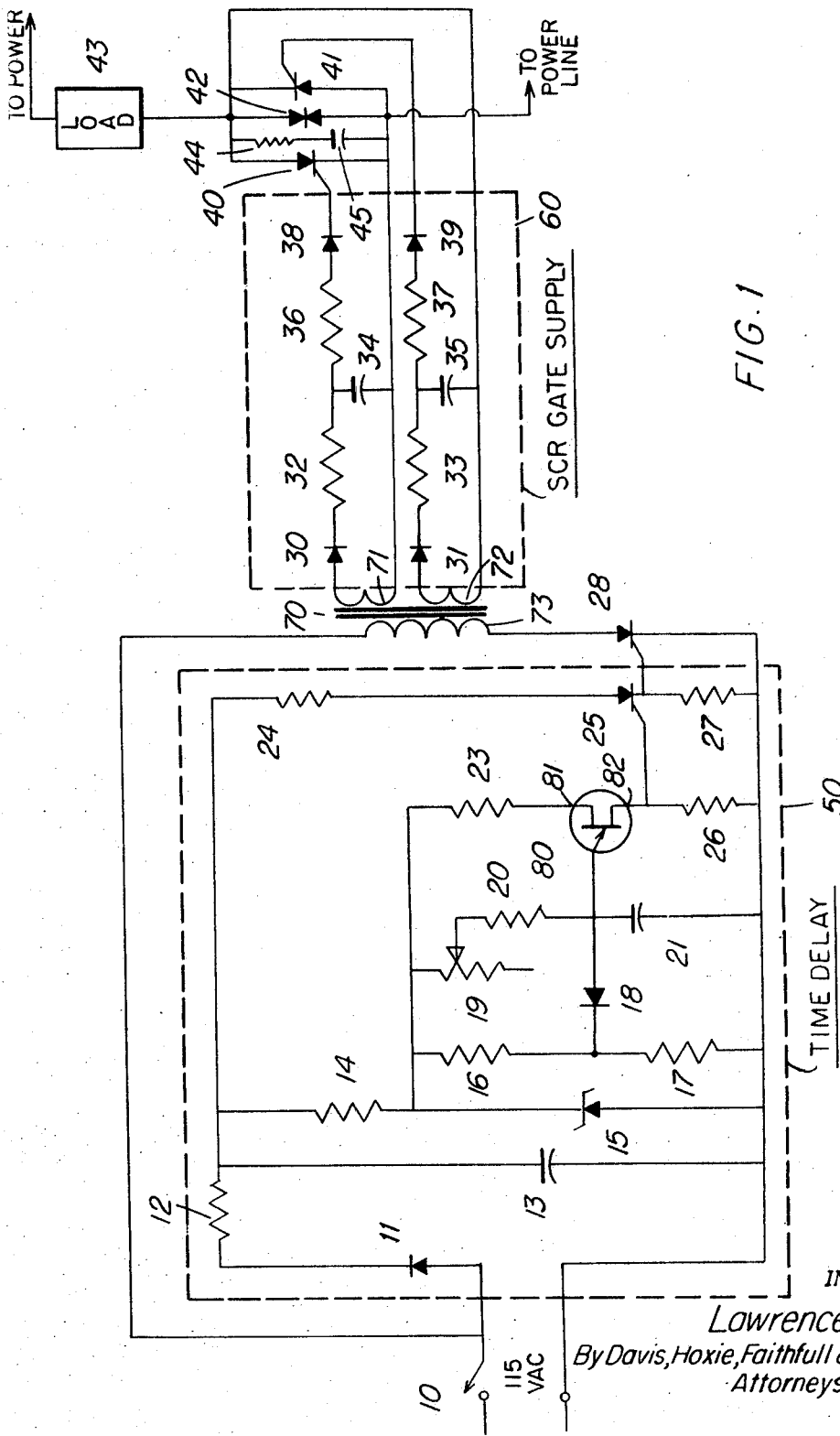

This invention relates to solid state switch devices suitable for electric motor control. A variable time delay circuit permits preselection of the time between an initiating signal and the completion of the load power circuit as is desired in a wide variety of motor operated automatic sequence machines.

Solid state power switching devices are superior to mechanical switches having movable contact devices. Solid state switches have no moving parts to wear, suffer from no problems of arcing or pitting, and have low contact resistance. They are virtually instantaneous in their action and require no mechanical effort to actuate.

Silicon controlled rectifiers heretofore used as power switches require a gating pulse to render them conductive during the alternating current half cycle when their anodes are positive. During the half cycle negative with respect to their anodes, they cease conducting and remain non-conductive until another gate pulse renders them conductive. It is apparent that the repeated gate pulses must arrive in proper phase and synchronism with the alternating current of the power line which is being switched. Line fluctuations and the reactance of the controlled load cause departures from synchronism which results in chopping of the power line wave form and attendant reduction in the power available to the load.

The present invention provides a control circuit for controlling load power switches which circuit may be entirely independent of the switched line. Fluctuations and wave-form characteristics of the switched power line have no effect upon the independent control circuit. Thus, numerous unrelated power lines may be controlled by one control circuit without concern for differences in power factor, phase relationships, voltage, or reactance characteristics of the loads.

The present invention also provides continuous direct current to the gates of the silicon controlled rectifiers. This gate current may be derived from a source independent of the load power line. The continued presence of direct gate current permits the silicon controlled rectifiers to turn on each time their respective anodes go positive and remain on until they are rendered non-conductive when their anodes experience a negative voltage. The constant direct current allows automatic commutation of the silicon controlled rectifiers and renders the switching action independent of power line fluctuations or of highly reactive loads.

A more complete understanding of these and other features of the present invention can be gained by reference to the following detailed descriptions of illustrative embodiments with reference to the accompanying drawing in which:

FIG. 1 is a schematic diagram of one embodiment of the time delay and switching circuits of the present invention; and FIG. 2 is a schematic diagram of another embodiment of the time delay and switching circuits of the present invention.

Referring now to FIG. 1, there is shown a variable electronic time delay circuit 50, and a silicon controlled rectifier power switch with electronic circuits for gate supply 60 coupled to the time delay circuit by transformer means 70.

To illustrate the manner in which the circuit of FIG. 1 operates to supply line power to the load 43, assume that switch 10 is closed, thereby connecting the time delay circuit 50 to a source of alternating current. Diode 11 produces unipolar half cycle sinusoidal pulses which are converted to unregulated direct current by a filter comprising surge resistor 12 and a shunt capacitor 13. This potential is reduced and regulated to a constant direct current voltage by means of a Zener diode 15 and series resistor 14.

The regulated direct current voltage thus produced is reduced to a desired value by means of a potentiometer 19 and series resistor 20 to become an adjustable charging voltage for storage capacitor 21. The regulated direct current is also used to forward bias the base-1 and base-2 terminals 81 and 82 of a unijunction transistor 80. Resistors 23 and 26 determine the forward bias voltage.

When the charging voltage across the capacitor 21 exceeds the conduction threshold of the unijunction transistor 80, the transistor becomes conductive to provide a low impedance discharge path for the capacitor 21 to the gate terminal of a silicon controlled rectifier 25 thereby rendering it conductive. A unipolar potential is established by the voltage divider comprising resistors 24 and 27. That potential is utilized as a source of gate current to render silicon controlled rectifier 28 conductive whenever its anode potential is positive.

Silicon controlled rectifier 25 remains conductive after timing out of the delay circuit as above described, due to its thyratron-type action irrespective of the absence of gate drive previously supplied by transistor 80. Thus, once the delay circuit 50 has timed out, a constant direct current is supplied to the gate of silicon controlled rectifier 28 to allow it to commutate "on" each time the alternating current present at the anode of 28 becomes positive. Silicon controlled rectifier 28 is thus "latched" in the "on" condition.

Upon interruption of working potential, for example, by opening the switch 10, gate drive for silicon controlled rectifier 28 is terminated, thereby rendering it non-conductive. Capacitor 21 is rapidly reset by discharging it through the path established by diode 18 and resistor 17. So long as switch 10 is closed, the voltage available at diode 18 is determined by the voltage divider 16, 17. That voltage is determined to be higher than the charging voltage applied to capacitor 21 to hold diode 18 non-conductive. Upon opening switch 10, diode 18 becomes conductive to allow complete discharge of capacitor 21.

Actuation of time delay circuit ultimately results in half wave voltage in the primary 73 of transformer 70. This half wave voltage is transformed to the secondaries 71 and 72. The secondary wave form is unsymmetrical with respect to zero reference since faithful transformation of the applied half cycle is accomplished, but stored energy in the transformer provides only a poor approximation of the other half cycle. In the "SCR gate supply circuit" 60, the polarity of the transformer 70 is observed in order to rectify the larger amplitude half cycle by means of diodes 30 and 31. Diodes 38 and 39 and current limiting resistors 36 and 37 prevent reverse current from reaching the gate terminals of silicon controlled rectifiers 40 and 41.

Direct current is thus supplied by gate supply circuit 60 to the gates of the oppositely poled pair of silicon controlled rectifiers 40 and 41 to allow them to commutate "on" during the appropriate half cycle of the power line supplying the load. Interruption of the working voltage input to the time delay circuit 50 terminates gate current output from circuit 60 to cause the power switching silicon controlled rectifiers 40 and 41 to become non-conductive, thereby terminating power to the load 43.

A bidirectional voltage limiter such as a Thyrector 42 is employed to protect the silicon controlled rectifiers 40 and 41 from reverse breakdown due to power surges. Resistor 44 and capacitor 45 serve to prevent inadvertent turn-on of 40 and 41 by such surge transients.

FIGURE 2 illustrates a circuit having many features in identity with the circuit of FIGURE 1. Those identical elements are similarly numbered. The following description of the circuit of FIGURE 2 is limited to the areas of difference from that of FIGURE 1.

The embodiment of FIG. 2 utilizes a bilaterally conductive controlled rectifier 90. One such device is manufactured under the trademark TRIAC by the General Electric Company. The properties of the device 90 are such that upon having gate terminal 91 thereof energized by current from time delay circuit 50, it will conduct in the direction in which the terminal electrodes 92 and 93 are forward biased. It will also conduct in the opposite direction when provided with current at gate terminal 91. Thus, when bilaterally conducting rectifier 90 is gated with steady direct current as is illustrated in FIGURE 2, it will conduct for nearly the full duration of each half cycle and thus provide transformer 70 with nearly full line voltage alternating current at its primary winding 73.

Where the circuit parameters of the time delay circuit 50 are chosen to provide a pulse repetition rate sufficiently high with respect to the 60 cycle line voltage, silicon controlled rectifier 25 may be eliminated from the FIGURE 2 embodiment. Since the bilaterally conductive device 90 will continuously conduct with sufficiently rapid pulses, the steady direct current provided at gate 91 by silicon controlled rectifier 25 is not necessary. Accordingly, gate 91 of element 90 may be directly connected to terminal 82 of the unijunction transistor 80.

It is readily apparent that plural phase loads as well as plural power lines may be controlled by the above-described devices by provision of an appropriate number of power switching silicon controlled rectifier pairs such as 40 and 41 and on appropriate number of gate supply circuits such as 60 including additional transformer secondary windings such as 71 and 72.

It is to be understood that the above-described arrangements are only descriptive of the application of the principles of the present invention. Numerous other arrangemenst may be devised without departing from the spirit and scope of the invention.

What is claimed is:
1. In combination in a control circuit;
 a supply of alternating current voltage,
 transformer means inclduing primary and secondary windings,
 first gate controlled semiconductor rectifier means connected in series with said supply and said transformer primary winding,
 an additional silicon controlled rectifier means connected across a supply of direct current having a minimum amplitude in excess of that required to sustain said additional silicon controlled rectifier means in a conductive state,
 the gate termnal of said first gate controlled semiconductor rectifier means being connected to said supply of direct current,
 the gate terminal of said additional silicon controlled rectifier means being connected to the pulse output of a unijunction transistor in a resistance-capacitance timing circuit having an adjustable time constant, whereby said additional silicon controlled rectifier means is latched in a conductive state by an output pulse of said transistor,
 a load,
 means for supplying electrical energy to said load, and
 second gate controlled semiconductor rectifier means connected between said electrical energy supply means and said load, the gate of said second semiconductor rectifier means being connected to said transformer secondary winding.

2. The combination of claim 1 wherein said first gated semiconductor rectifier means comprises a bilaterally conductive controlled rectifier.

3. The combination of claim 1 wherein said first gated semiconductor rectifier means comprises a silicon controlled rectifier.

4. The combination of claim 1 wherein said second gated semiconductor rectifier means comprises at least one oppositely poled pair of silicon controlled rectifiers, and gate potential supplying means for each such rectifier comprising a secondary winding of said transformer and means to convert alternating to direct current.

5. In combination in a control circuit,
 means for supplying alternating current voltage,
 transformer means including primary and secondary windings,
 a first silicon controlled rectifier connected in series with said supply means and said primary winding,
 a source of direct current gate control potential connected to the gate terminal of said first silicon controlled rectifier, said direct current having a minimum amplitude in excess of that required to sustain said first silicon controlled rectifier in a conductive state,
 an additional silicon controlled rectifier connected across said source of direct current,
 a timing circuit connected to the gate terminal of said additional silicon controlled rectifier and to said supply of alternating current voltage,
 said timing circuit comprising means to convert said alternating current into regulated direct current, means to adjust the potential of a portion of said direct current to provide a charging voltage, capacitor means connected to said charging voltage adjustment means and to the input of a unijunction transistor, the output of said transistor being connected to the gate terminal of said additional silicon controlled rectifier,
 a load,
 means for supplying electrical energy to said load,
 at least one pair of oppositely poled second silicon controlled rectifiers connected between said energy supply means and said load, and for each such rectifier,
 means for converting alternating current to direct current connected between a secondary of said transformer and the gate terminal of said silicon controlled rectifiers.

6. In combination in a control circuit,
 means for supplying alternating current voltage,
 transformer means including primary and secondary windings,
 a bilaterally conductive controlled rectifier means connected in series with said supply means and said primary winding, a timing circuit connected to the gate terminal of said bilaterally conductive controlled rectifier means and to said supply of alternating current voltage, said timing circuit comprising means to convert said alternating current into regulated direct current, means to adjust the potential of a portion of said direct current to provide a charging voltage, capacitor means connected to said charging voltage adjustment means and to the input of a unijunction transistor, the output of said transistor being connected to the gate terminal of said bilaterally conductive controlled rectifier means, a load, means for supplying electrical energy to said load, at least one pair of oppositely poled silicon controlled rectifiers connected between said energy supply means and said load, and for each such rectifier, means for converting alternating current to direct current connected between a secondary of said transformer and the gate terminal of said silicon controlled rectifier.

7. In combination in a control circuit, means for supplying alternating current voltage, transformer means including primary and secondary windings, a first silicon controlled rectifier connected in series with said supply means and said primary winding, a source of direct current gate control potential connected to said first silicon controlled rectifier, said direct current having a minimum amplitude in excess of that required to sustain said first silicon controlled rectifier in a conductive state, an additional silicon controlled rectifier connected across said source of direct current, a timing circuit connected to the gate terminal of said additional silicon controlled rectifier and to said supply of alternating current voltage, said timing circuit comprising means to convert said alternating current into regulated direct current, means to adjust the potential of a portion of said direct current to provide a charging voltage, capacitor means connected to said charging voltage adjustment means and to the input of a unijunction transistor, the output of said transistor being connected to the gate terminal of said additional silicon controlled rectifier, a load, means for supplying electrical energy to said load, gate controlled semiconductor rectifier means connected between said energy supply means and said load, and for each such rectifier means, means for converting alternating current to direct current connected between a secondary of said transformer and the gate terminal of said gate controlled semiconductor rectifier means.

8. In combination in a control circuit, means for supplying alternating current voltage, transformer means including primary and secondary windings, a bilaterally conductive controlled rectifier means connected in series with said supply means and said primary winding, a timing circuit connected to the gate terminal of said bilaterally conductive controlled rectifier means and to said supply of alternating current voltage, said timing circuit comprising means to convert said alternating current into regulated direct current, means to adjust the potential of a portion of said direct current to provide a charging voltage, capacitor means connected to said charging voltage adjustment means and to the input of a unijunction transistor, the output of said transistor being connected to the gate terminal of said bilaterally conductive controlled rectifier means, a load, means for supplying electrical energy to said load, gate controlled semiconductor rectifier means connected between said energy supply means and said load, and for each such rectifier means, means for converting alternating current to direct current connected between a secondary of said transformer and the gate terminal of said gate controlled semiconductor rectifier means.

References Cited

UNITED STATES PATENTS

| | | |
|---|---|---|
| 3,283,177 | 11/1966 | Cooper. |
| 3,300,622 | 1/1967 | Swain. |
| 3,323,017 | 5/1967 | Powell et al. |
| 3,344,311 | 9/1967 | Nuckolls. |
| 3,360,713 | 12/1967 | Howell. |

JOHN F. COUCH, Primary Examiner

A. D. PELLINEN, Assistant Examiner

U.S. Cl. X.R.

323—24, 32, 38